United States Patent [19]
Goldenberg

[11] Patent Number: 5,498,043
[45] Date of Patent: Mar. 12, 1996

[54] HOSE FITTING HAVING FERRULE ANTI-ROTATION RATCHET TEETH

[75] Inventor: Joseph M. Goldenberg, Upper Saddle River, N.J.

[73] Assignee: Plastic Specialties and Technologies, Inc., Ridgefield, N.J.

[21] Appl. No.: 377,858

[22] Filed: Jan. 25, 1995

[51] Int. Cl.$^6$ ................................................. F16L 33/24
[52] U.S. Cl. .......................... 285/242; 285/255; 285/251
[58] Field of Search ................................ 285/242–253, 285/259

[56] References Cited

U.S. PATENT DOCUMENTS

| | | |
|---|---|---|
| Re. 23,586 | 11/1952 | Merriman . |
| 554,666 | 2/1896 | Feltner ........................ 285/259 |
| 1,540,374 | 6/1925 | Stevens . |
| 1,580,694 | 4/1926 | Smith . |
| 1,622,581 | 3/1927 | Gunkel . |
| 1,691,599 | 11/1928 | Zimmermann . |
| 1,888,741 | 11/1932 | Schellin ........................ 285/255 |
| 2,491,406 | 12/1949 | Zeeb . |
| 2,709,093 | 5/1955 | Zeeb . |
| 2,745,303 | 5/1956 | Cornelius . |
| 2,783,810 | 3/1957 | Wrigley . |
| 2,805,088 | 9/1957 | Cline et al. . |
| 3,032,358 | 5/1962 | Rolston ........................ 285/251 |
| 3,069,187 | 12/1962 | Collins et al. . |
| 3,177,016 | 4/1965 | Holmgren . |
| 3,201,149 | 8/1965 | Bragg . |
| 3,273,443 | 9/1966 | Rubin . |
| 3,383,973 | 5/1968 | Gazal . |
| 3,408,099 | 10/1968 | Appleton . |
| 3,555,491 | 1/1971 | Moss . |
| 3,726,547 | 4/1973 | Cox, Jr. ........................ 285/251 |
| 3,788,676 | 1/1974 | Lossie . |
| 3,791,680 | 2/1974 | Cleare ........................ 285/251 |
| 3,902,745 | 9/1975 | Mooney et al. . |
| 3,929,054 | 12/1975 | Gutshall . |
| 3,971,614 | 1/1976 | Paoli et al. . |
| 3,980,325 | 9/1976 | Robertson ........................ 285/249 |
| 4,170,163 | 10/1979 | Payne . |
| 4,225,162 | 9/1980 | Dola ........................ 285/251 |
| 4,434,736 | 3/1984 | Szostak et al. . |
| 4,577,894 | 3/1986 | Wake ........................ 285/255 |
| 4,609,314 | 9/1986 | Metz . |
| 4,732,343 | 3/1988 | Maruyama . |
| 4,736,969 | 4/1988 | Fouts . |
| 4,749,217 | 6/1988 | Causby et al. ........................ 285/245 |
| 4,784,549 | 11/1988 | Wing . |
| 4,804,212 | 2/1989 | Vyse . |
| 4,893,848 | 1/1990 | Melcher . |
| 4,940,260 | 7/1990 | Uriate Odriozola . |
| 4,946,200 | 8/1990 | Blenkush et al. ........................ 285/255 |
| 4,993,755 | 2/1991 | Johnston . |
| 5,131,690 | 7/1992 | Mano . |
| 5,188,398 | 2/1993 | Parimore, Jr. et al. . |

*Primary Examiner*—Eric K. Nicholson
*Attorney, Agent, or Firm*—Wood, Herron & Evans

[57] ABSTRACT

A hose fitting for permanent attachment to a flexible hose such as a garden hose. The fitting includes a tubular member having helical barbs or threads on an outer surface portion thereof for allowing the tubular member to be firmly held within an open end of the hose and to further form helical deformations in the hose. The fitting further includes a ferrule having similar helical barbs or threads on an inner surface thereof for allowing the ferrule to be threaded over the hose end having the helical deformations formed by the tubular member inserted therein. The tubular member and the ferrule include mating ratchet teeth which lock together when the ferrule is threaded over the deformations in the hose end such that the fitting is permanently attached to the hose. The tubular member includes a coupling portion on its outer end for allowing the hose fitting to be attached to another fitting or a fluid device such as a faucet or lawn sprinkler. The tubular member and ferrule are both preferably formed from polymeric material.

19 Claims, 2 Drawing Sheets

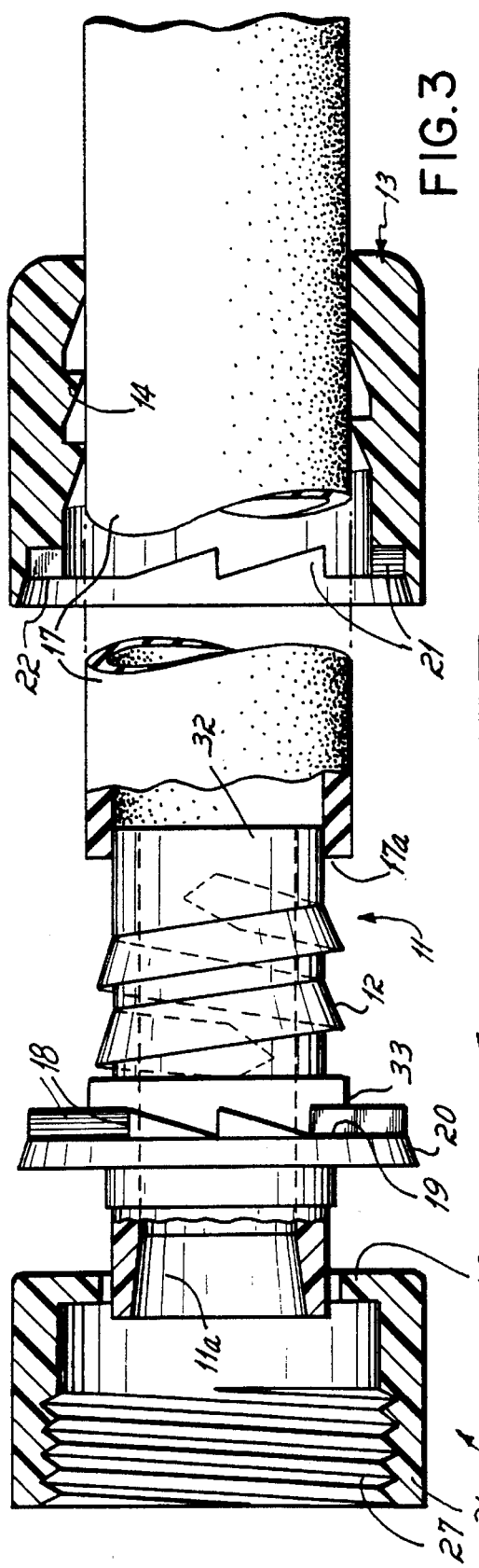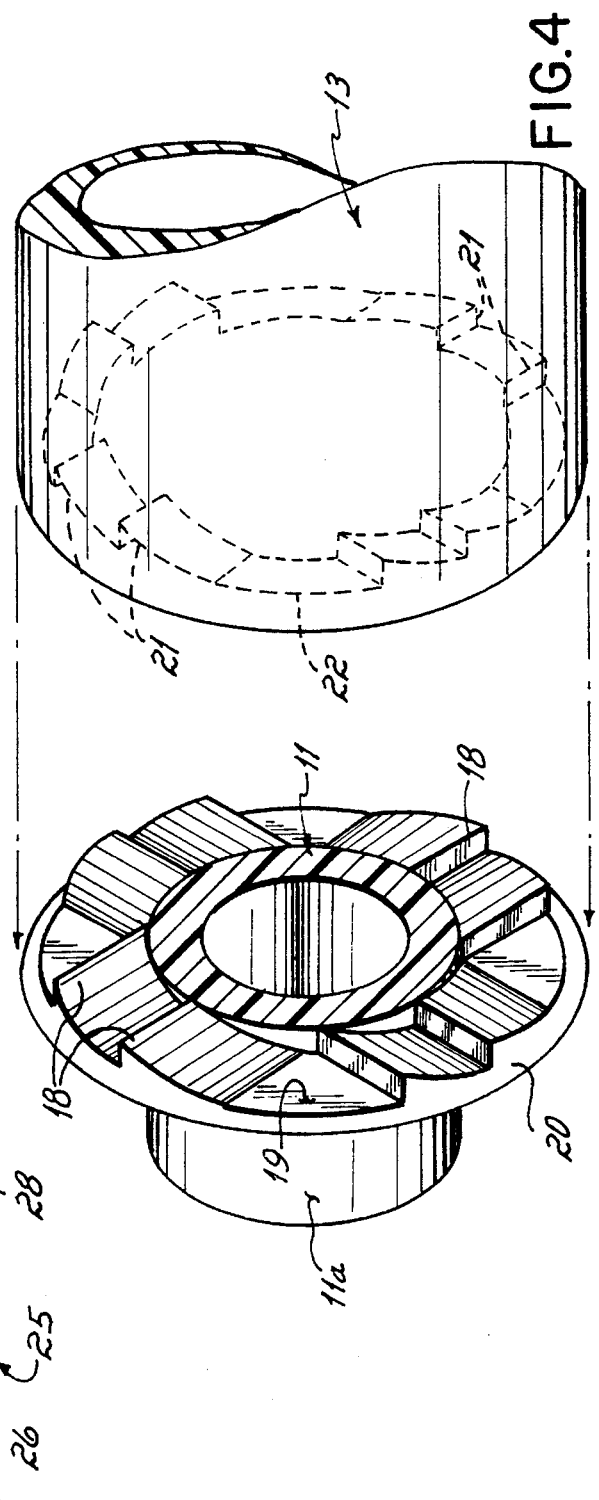

HOSE FITTING HAVING FERRULE ANTI-ROTATION RATCHET TEETH

BACKGROUND OF THE INVENTION

The present invention generally relates to fluid couplings and, more particularly, to fittings used on flexible hoses such as common garden hoses used for carrying liquids.

Hose fittings of the above-mentioned type are used at the open end of a flexible hose to connect the hose in a fluid tight manner to other fittings, faucets, spray devices or other objects. In the past these fittings have been formed of materials such as metal alloys which allow the fitting to be permanently secured to the hose by swaging or otherwise deforming tubular portions of the fitting onto the end of the hose. Such metallic hose fittings are relatively expensive to manufacture and often corrode due to their constant contact with various liquids.

Hose fittings have been developed in the past which utilize an inner tubular component and an outer tubular component to compress the hose therebetween and secure the fitting in a fluid tight manner to the end of the hose. Examples of such fittings are found in U.S. Pat. No. 3,177,016 to Holmgren, U.S. Pat. No. 3,788,676 to Lossie and U.S. Pat. No. 4,736,969 to Fouts. Each of the fittings disclosed in these patents suffers from the disadvantage that there is no positive, irreversible locking mechanism for permanently establishing a fluid tight seal between the fitting and the hose. That is, each of these patents disclose two piece fittings wherein two components of the fitting are threadingly secured together in order to compress the hose therebetween. Since the two components are threaded together, they may also become unthreaded with respect to each other and thereby lose their fluid tight seal with the hose.

U.S. Pat. No. 3,902,745 to Mooney et al. discloses an electrical connector for providing an hermetic coupling with a flexible electrical conduit of the type having an external liquid and gas proof sheath of resilient material surrounding a helically wound flexible metallic core provided with an internal helical channel. Mooney et al. disclose the use of an annular channel formed in an outer end face of a locking collar which registers with outer projections on the tubular component which threads into the electrical conduit. However, this locking mechanism suffers from the disadvantage that it requires that the locking collar to be formed of a polymeric material while the tubular component and its projections are formed of a metallic material thus increasing the cost of the fitting as well as its susceptibility to corrosion. Moreover, this electrical connector is designed specifically for use with electrical conduits having an inner core in the form a spirally wound metallic strip. This electrical connector therefore would be impossible to use on a fluid carrying flexible hose.

In view of the shortcomings of the prior art, there is a need in the art for a hose fitting which may be formed entirely of relatively inexpensive polymeric material and which further includes means for positively and permanently securing the hose fitting to an open end of a hose in a fluid tight manner.

SUMMARY OF THE INVENTION

The preferred embodiment of the present invention comprises a hose fitting including a tubular member having protrusions on an outer surface portion thereof with these protrusions preferably taking the form of helically extending barbs or threads for deforming a flexible hose when the tubular member is inserted into an open end of the hose. The fitting further includes a ferrule having a female threaded inner surface for allowing the ferrule to be threaded over the deformed outside surface of the flexible hose in a direction toward the open end thereof following the spiral or helical deformations created by the barbed tubular member. The deformed and compressed hose forms a fluid tight seal between the tubular member and the ferrule.

The tubular member and the ferrule have respective ratchet teeth which engage and lock with each other when the ferrule is threaded over the deformations in the hose. Once the ratchet teeth engage each other, the ferrule may only be turned in a tightening direction with respect to the tubular member. Thus, when the ferrule is fully tightened against the ratchet teeth on the tubular member, the hose is compressed between the ferrule and the tubular member in a fluid tight manner and the tubular member and ferrule may not be disconnected from each other.

More specifically, the tubular member includes a threaded portion having first and second ends and further having a coupling portion connected to the first end and a wall disposed between the tubular member and the coupling portion and extending outwardly and circumferentially about the tubular member. A surface on the wall which faces the threaded portion of the tubular member includes a plurality of ratchet teeth. The ferrule includes internal threads and further includes an end face having a plurality of ratchet teeth which mate with the ratchet teeth on the wall extending about the tubular member. The ratchet teeth on both the wall and the ferrule are angled such that, when the ratchet teeth on the ferrule are rotated against the ratchet teeth on the wall in one direction, i.e., the tightening direction of the threads on the ferrule, the ratchet teeth prevent any counter rotation of the ferrule with respect to the tubular member.

The coupling portion connected to the tubular member may take many forms depending on the use of the hose fitting. In a first preferred embodiment, the coupling portion is an internally threaded nut which is rotatably secured in a suitable manner to the tubular member. Conventional washers or other fluid sealing means are provided in the coupling portion for maintaining a fluid tight connection between the coupling portion and the fluid component to which it is being attached such as an outdoor faucet, lawn sprinkler or spray nozzle.

A second preferred embodiment of the hose fitting utilizes a male threaded coupler which is preferably integrally molded with the tubular member. It will be appreciated that the threads on both the female and male versions of the coupling portion section may correspond in size and pitch to standard threads used on garden hoses and the like.

Regardless of whether a male threaded, female threaded or other type of coupling portion section is utilized, a hose fitting of the present invention is attached in a fluid tight manner to the open end of a flexible hose in the same manner. The ferrule of the hose fitting is first placed onto the end of the hose such that the ratchet teeth face the open end of the hose. The tubular member is then threaded into the open end of the hose such that the helical barbs or threads of the tubular member deform the flexible hose. The ferrule is then threaded onto the deformations in the hose toward the open end of the hose. During the process of threading the ferrule over the tubular member, the hose is compressed in a fluid tight manner between the ferrule and the tubular member. The ferrule is tightened or threaded toward the open end of the hose until the ratchet teeth on its end face engage and lock with the ratchet teeth on the wall extending outwardly about the tubular member.

It will be appreciated that the fluid tight connection between the ferrule, the hose and the tubular member is a permanent connection since the ferrule can neither be pulled nor rotated away from the wall of the tubular member. In addition, both the tubular member and the ferrule may economically be formed of a relatively inexpensive polymeric material while still producing a permanent fluid tight connection between the fitting and the hose. Finally, the tubular member and ferrule may be economically manufactured through processes such as molding, and may be applied to the end of a hose very simply and quickly.

Further advantages of the present invention will become more readily apparent through the following detailed description taken in conjunction with the accompanying drawings.

BRIEF DESCRIPTION OF THE DRAWINGS

FIG. 3 is an exploded side view in partial cross-section of the first embodiment of the invention; and FIG. 4 is a perspective view of the ratchet mechanism of the hose fitting employed in both embodiments of the invention.

DETAILED DESCRIPTION OF THE PREFERRED EMBODIMENTS

Figure 1:
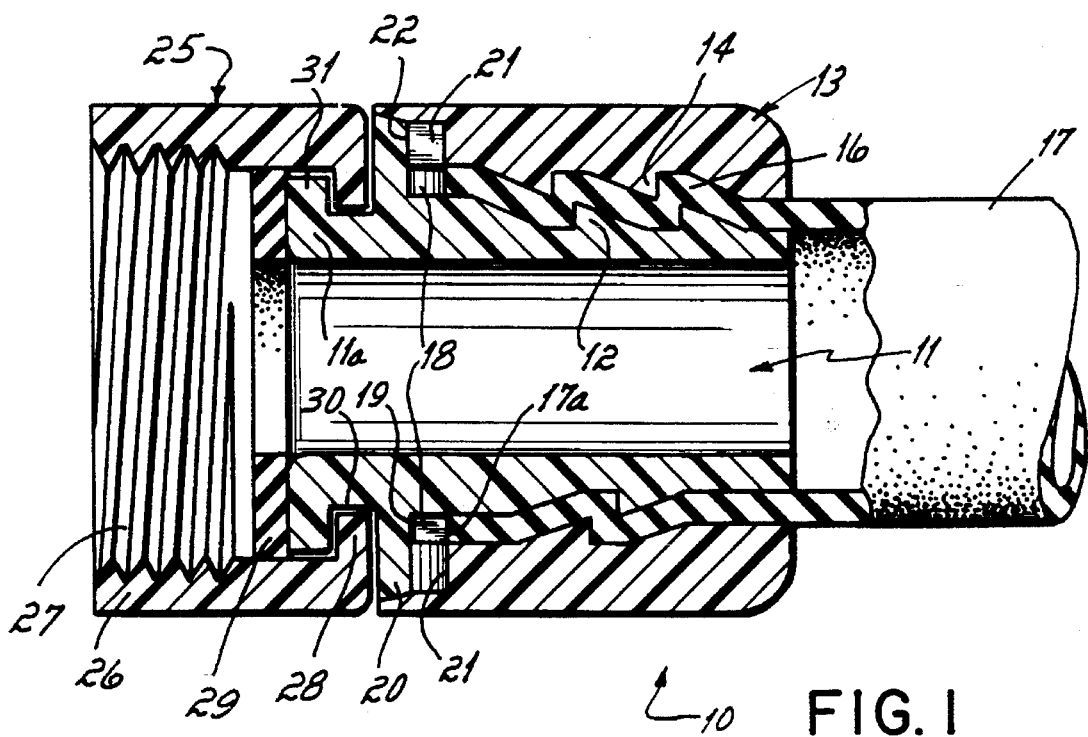
FIG. 1 is an elevated side view in partial cross-section of a hose fitting according to a first embodiment of the invention having a female threaded coupling portion.

As shown in FIG. 1, a first preferred embodiment of the invention comprises a two piece hose fitting 10 including a tubular member 11 having protrusions 12 on an outer surface portion thereof and a ferrule 13 having protrusions 14 extending from an inner surface thereof. Both the outer protrusions 12 on the tubular member 11 and the inner protrusions 14 on the ferrule 13 preferably take the form of helical barbs or threads. When the tubular member 11 and ferrule 13 are assembled onto the open end 17a of a hose 17, as further explained in detail below, the protrusions or barbs 12, 14 interact to form deformations 16 in the hose 17 to create a fluid tight seal between the hose fitting 10 and the flexible hose 17. Specifically referring to FIGS. 1 and 4, the ratchet locking mechanism of the tubular member 11 includes ratchet teeth 18 extending outwardly from an end surface 19 of a wall 20 circumferentially extending about the tubular member 11. The ratchet teeth 18 are adapted to lock with similarly shaped ratchet teeth 21 located on an end surface 22 of the ferrule 13. The ratchet teeth 18, 21 allow relative rotation between the tubular member 11 and ferrule 13 in only one direction when the ratchet teeth 18 engage the ratchet teeth 21. The direction of relative rotation allowed by the ratchet teeth 18, 21 corresponds to the tightening direction of the threads or helical barbs 12, 14 of the tubular member 11 and ferrule 13. Thus, when the ferrule 13 is threaded over the deformations 16 in the flexible hose 17 created by the threaded barbed portion 12 of the tubular member 11, the ferrule 13 may not be unthreaded therefrom once the ratchet teeth 21 engage the ratchet teeth 18.

As shown in FIG. 1, the hose fitting 10 includes a coupling portion 25 for allowing the flexible hose 17 to be coupled to another fluid component which may be, for example, a common outdoor faucet or sprinkler. In the first embodiment, shown in FIGS. 1 and 3, the coupling portion 25 includes a rotatable nut 26 having internal threads 27 for making a fluid tight connection between the hose fitting 10 and another fluid component (not shown). As further shown in FIG. 1, the nut 26 is rotatably attached to a tubular member 11a which integrally extends from the tubular member 11. The nut 26 includes an inwardly and annularly extending lip 28 which is rotatably captured within an annular groove 30 created between the circumferential wall 22 and an outwardly and annularly extending retaining lip 31 of the tubular member 11a. A conventional washer 29 is inserted into the nut 26 and against the retaining lip 31 to provide a fluid tight connection between a fluid component (not shown) and the tubular member 11. The lip 31 may be formed during assembly of the tubular member 11 to the nut 26 by, for example, heating and then deforming the tubular member 11a (FIG. 3) to form the retaining lip 31. Of course, other manners of rotatably attaching the nut 26 to the tubular member 11 are also available to those of ordinary skill.

Figure 2:
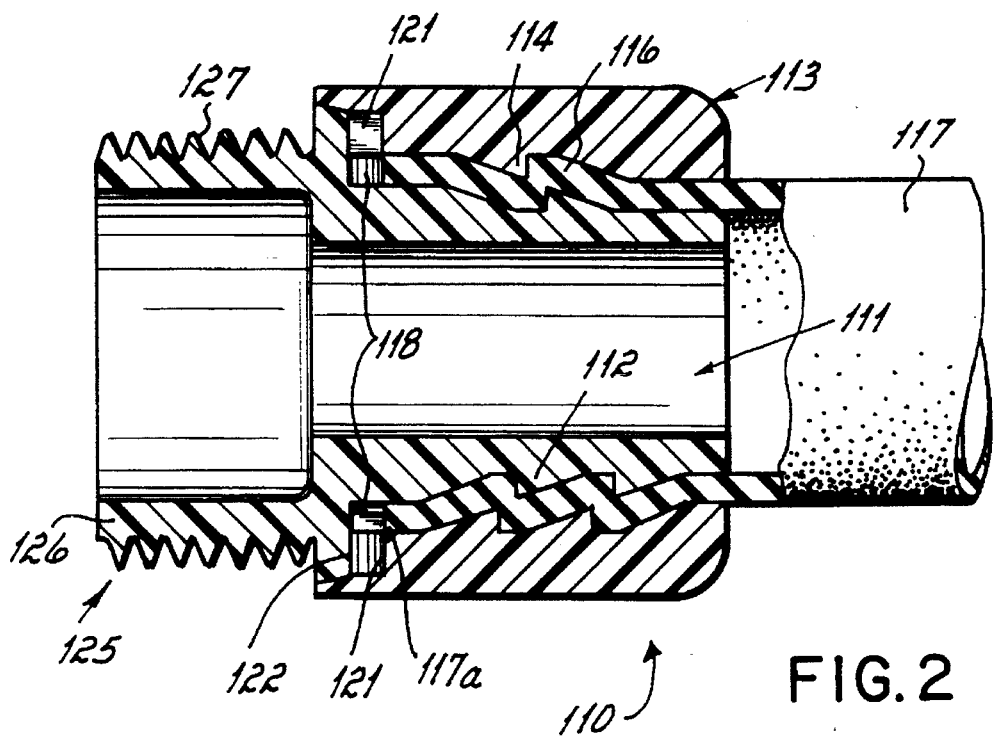
FIG. 2 is an elevated side view in partial cross-section of a hose fitting according to a second embodiment of the invention having a male threaded coupling portion.

FIG. 2 shows a hose fitting 110 constructed according to a second preferred embodiment of the present invention. The only difference between the hose fitting 110 shown in FIG. 2 and the hose fitting 10 shown in FIG. 1 is in the coupling section 125 of the hose fitting 110. In this regard, instead of employing a rotatable internally threaded nut 26 as shown on the hose fitting 10, the hose fitting 110 utilizes an extension portion 126 which is an integral part of the tubular member 111 and includes external threads 127 for attaching the hose fitting 110 to another fluid component (not shown). In all other regards, the hose fitting 110 is designed such that it attaches to the end of a flexible hose 117 in exactly the same manner as the hose fitting 10.

More specifically, the hose fitting 110 includes a tubular member 111 including external helical barbs or threads 112 and a ferrule 113 having internal helical barbs or threads 114. When the hose fitting 110 is connected to the end of a flexible hose 117 in a manner to be described more particularly below, the external threads or barbs 112 on the tubular member 111 interact with the internal threads or barbs 114 on the ferrule 113 to form deformations 116 at the open end 117a of the flexible hose 117. Like the first embodiment, the tubular member 111 further includes an outwardly and circumferentially extending wall 122 having ratchet teeth 118 adapted to face the open end 117a of the hose 117 when the tubular member 111 is inserted therein. The ferrule 113 likewise includes a series of ratchet teeth 121 which irreversibly lock with the ratchet teeth 118 when the ferrule 113 is threaded over the deformations 116 in the hose 117. It will be appreciated that the ferrules 13, 113 of the first and second embodiments preferably have exactly the same design and are, therefore, interchangeable with one another.

The invention will now be described in terms of the attachment of the hose fitting 10 to the open end 17a of a flexible hose 17 with the understanding that the fluid tight, permanent attachment of the hose fitting 10 to the hose 17 is exactly the same as the fluid tight, permanent attachment of the hose fitting 110 to the flexible hose 117. As shown in FIG. 3, the ferrule 13 slides onto the end of the hose 17 with the ratchet teeth 21 facing the open end 17a of the hose 17. A first end 32 of the tubular member 11 is then inserted into the open end 17a of the flexible hose 17 and the tubular member 11 is threaded into the flexible hose 17 such that the barbs or threads 12 helically deform the flexible hose 17 as shown in FIG. 1. The tubular member 11 is threaded into the open end of the flexible hose 17 until the ratchet teeth 18 located proximate the second end 33 of the tubular member 11 abut the open end 17a of the flexible hose 17. Once the tubular member 11 is in this position, the ferrule 13 is threaded over the deformations in the hose 17 until the ratchet teeth 21 engage the ratchet teeth 18 at which point the tubular member 11 and ferrule 13 are permanently attached to one another as shown in FIG. 1. Once attached in this manner, the hose fitting 10 can neither be pulled off the flexible hose 17 in an axial direction because of the grip that the barbs 12, 14 have on the deformed portions 16 of the hose 17 nor can the ferrule 13 be unthreaded from the tubular member 11 due to the locking engagement of the ratchet teeth 18, 21.

Accordingly, the present invention provides a hose fitting which is essentially comprised of two pieces which allow the hose fitting to be easily locked onto the open end of a flexible hose in a fluid tight and permanent manner without necessitating either expensive materials or costly manufacturing methods. In this regard, the tubular member and the ferrule of the hose fitting may each be economically molded from polymeric material and not formed from more expensive metals since the hose fitting is attached to the flexible hose without using swaging or other manufacturing techniques which deform the hose fitting to clamp it onto the flexible hose 17.

While preferred embodiments of the present invention have been described above, various modifications thereof will become readily apparent to those of ordinary skill without departing from the scope of the invention and Applicant intends to be bound only by the scope of the claims appended hereto.

What is claimed is:

1. A hose fitting adapted to be coupled to an open end of a flexible hose, said fitting comprising:

a tubular member having an outer surface, said outer surface having a helical barb thereon for deforming said hose when said tubular member is inserted into the open end of said hose, said tubular member further including ratchet teeth extending outwardly from said outer surface; and a ferrule having a helical groove on an inner surface thereof for allowing said ferrule to be threaded onto deformations in said hose created by said helical protrusion of said tubular member, said ferrule further including ratchet teeth for engaging said ratchet teeth of said tubular member and locking said ferrule to said tubular member when said ferrule is threaded onto the deformations in said hose.

2. The hose fitting of claim 1 wherein said tubular member and said ferrule are both formed from a polymeric material.

3. The hose fitting of claim 1 further comprising:

a wall extending outwardly about said tubular member, said wall including said ratchet teeth for engaging said ratchet teeth of said ferrule.

4. The hose fitting of claim 1 wherein said outer surface is located proximate a first end of said tubular member and said fitting further comprises:

a fluid coupling connected to a second end of said tubular member for allowing said fitting to be attached to other fluid components.

5. The hose fitting of claim 4 wherein said fluid coupling further comprises:

a female threaded coupling rotatably mounted to said hose fitting proximate said second end of said tubular member.

6. The hose fitting of claim 4 wherein said fluid coupling further comprises:

a male threaded coupling extending from said second end of said tubular member.

7. A hose fitting adapted to be coupled to an open end of a flexible hose, said fitting comprising:

a tubular member formed from a polymeric material and including first and second ends and having helical barbs on an outer surface thereof disposed between said first and second ends for deforming said hose when said tubular member is inserted into an open end of said hose;

a fluid coupling connected to said hose fitting proximate said first end of said tubular member for allowing said fitting to be attached to other fluid components;

a wall disposed between said tubular member and said fluid coupling and extending outwardly and circumferentially about said tubular member, said wall including ratchet teeth thereon; and, a ferrule formed from a polymeric material and having a helical groove on an inner surface thereof for allowing said ferrule to be threaded onto deformations in said hose created by said helical barbs of said tubular member, said ferrule having an end surface including ratchet teeth for engaging said ratchet teeth on said wall and locking said ferrule to said wall when said ferrule is threaded on the deformations in said hose.

8. A combined hose and fitting comprising:

a flexible hose;

a tubular member having protrusions on an outer surface portion thereof, said tubular member being inserted in the open end of said hose such that said protrusions deform said hose, said tubular member further including ratchet teeth extending outwardly of an outer surface of said hose when said tubular member is inserted into said hose; and, a ferrule having a female threaded inner surface threadingly engaging said outer surface of said hose, said ferrule further including ratchet teeth for engaging said ratchet teeth of said tubular member, wherein said ferrule is locked to said tubular member through engagement of the respective ratchet teeth of said ferrule and said tubular member.

9. The combined hose and fitting of claim 8 wherein said tubular member and said ferrule are each formed from a polymeric material.

10. The combined hose and fitting of claim 8 further comprising:

a wall extending outwardly about said tubular member, said wall including said ratchet teeth for engaging said ratchet teeth of said ferrule.

11. The hose and fitting of claim 10 wherein said outer surface is located proximate a first end of said tubular member and said fitting further comprises:

a fluid coupling connected to a second end of said tubular member for allowing said fitting to be attached to other fluid components.

12. The combined hose and fitting of claim 11 wherein said fluid coupling further comprises:

a female threaded coupling rotatably mounted to said hose fitting proximate said second end of said tubular member.

13. The combined hose and fitting of claim 11 wherein said fluid coupling further comprises:

a male threaded coupling extending from said second end of said tubular member.

14. A combined hose and fitting comprising:

a flexible hose;

a tubular member having a helical protrusion on an outer surface portion thereof, said tubular member being disposed within the open end of said hose such that said helical protrusion deforms said hose, said tubular member further including ratchet teeth extending outwardly of an outer surface of said hose; and, a ferrule having a female threaded inner surface threadingly engaging said outer surface of said hose, said ferrule further including ratchet teeth for engaging said ratchet teeth of said tubular member, wherein the inner surface of said ferrule is threaded in a direction allowing the ferrule to be rotated on the hose and moved toward the open end of said hose until the respective ratchet teeth of said ferrule and said tubular member engage each other to prevent rotation of said ferrule in an opposite direction.

15. The combined hose and fitting of claim 14 wherein said tubular member and said ferrule are each formed from a polymeric material.

16. The combined hose and fitting of claim 14 further comprising:

a wall extending outwardly about said tubular member, said wall including said ratchet teeth for engaging said ratchet teeth of said ferrule.

17. The hose and fitting of claim 16 wherein said outer surface is located proximate a first end of said tubular member and said fitting further comprises:

a fluid coupling connected to a second end of said tubular member for allowing said fitting to be attached to other fluid components.

18. The combined hose and fitting of claim 17 wherein said fluid coupling further comprises:

a female threaded coupling rotatably mounted to said hose fitting proximate said second end of said tubular member.

19. The combined hose and fitting of claim 17 wherein said fluid coupling further comprises:

a male threaded coupling extending from said second end of said tubular member.

* * * * *